United States Patent [19]
Reik et al.

[11] Patent Number: 5,349,883
[45] Date of Patent: Sep. 27, 1994

[54] APPARATUS FOR COUNTERACTING TORSIONAL STRESSES

[75] Inventors: Wolfgang Reik, Bühl; Hans-Dieter Elison, Offenburg, both of Fed. Rep. of Germany

[73] Assignee: Luk Lamellen und Kupplungsbau, Bühl, Fed. Rep. of Germany

[21] Appl. No.: 70,492

[22] Filed: Jun. 2, 1993

Related U.S. Application Data

[63] Continuation of Ser. No. 730,241, Jul. 16, 1991, abandoned, which is a continuation-in-part of Ser. No. 405,417, Sep. 11, 1989, Pat. No. 5,040,433, which is a continuation of Ser. No. 901,775, Aug. 28, 1986, abandoned.

[30] Foreign Application Priority Data

| Sep. 7, 1985 | [DE] | Fed. Rep. of Germany | 3532018 |
| Jul. 5, 1986 | [DE] | Fed. Rep. of Germany | 3622697 |
| Aug. 25, 1986 | [DE] | Fed. Rep. of Germany | 3628770 |
| Sep. 6, 1986 | [DE] | Fed. Rep. of Germany | 8623931[U] |

[51] Int. Cl.⁵ ............................................. F16F 15/10
[52] U.S. Cl. ............................ 74/574; 192/106.2
[58] Field of Search ............ 74/574; 192/106.1, 106.2, 192/70, 17; 464/24, 27, 66, 68

[56] References Cited

U.S. PATENT DOCUMENTS

| 2,276,870 | 3/1942 | Prantl | 464/66 X |
| 3,610,384 | 10/1971 | Borck | 192/113 B |
| 4,727,767 | 3/1988 | Aiki et al. | 192/106.2 X |
| 4,727,970 | 3/1988 | Reik et al. | 192/106.2 X |
| 4,739,866 | 4/1988 | Reik et al. | 464/66 X |
| 4,782,718 | 11/1988 | Hartig et al. | 192/106.2 X |
| 4,782,933 | 11/1988 | Jackel et al. | 192/106.2 X |
| 4,788,884 | 12/1988 | Reik et al. | 192/106.2 X |
| 4,850,244 | 7/1989 | Eckel et al. | 192/106.1 X |
| 4,946,420 | 8/1990 | Jackel | 192/106.2 X |
| 4,983,142 | 1/1991 | Despres et al. | 192/106.2 X |
| 4,989,710 | 2/1991 | Reik et al. | 192/106.2 X |
| 5,040,433 | 8/1991 | Reik et al. | 192/106.2 X |
| 5,042,632 | 8/1991 | Jackel | 192/106.2 |
| 5,103,688 | 4/1992 | Kuhne | 192/70.17 |

FOREIGN PATENT DOCUMENTS 3442679 5/1986 Fed. Rep. of Germany.
2160295 12/1985 United Kingdom.

*Primary Examiner*—Rodney M. Lindsey
*Attorney, Agent, or Firm*—Darby & Darby

[57] ABSTRACT

A vibration damping apparatus which is installed in the power train between the crankshaft of an internal combustion engine and the input shaft of a change-speed transmission in a motor vehicle has two coaxial flywheels which are rotatable relative to each other against the opposition of one or more dampers. The damper or dampers are installed in a fluid-containing chamber which is provided at least in part in one of the flywheels.

33 Claims, 3 Drawing Sheets

APPARATUS FOR COUNTERACTING TORSIONAL STRESSES

CROSS-REFERENCE TO RELATED CASE

This application is a continuation of application Ser. No. 07/730,241, filed Jul. 16, 1991, which is continuation-in-part of application Ser. No. 07/405,417, filed Sept. 11, 1989, now U.S. Pat. No. 5,040,433, which is a continuation application of application Ser. No. 06/901,775, filed Aug. 28, 1986, now abandoned.

BACKGROUND OF THE INVENTION

The present invention relates to apparatus for counteracting torsional stresses, and more particularly to improvements in apparatus for damping torsional vibrations between two or more coaxial flywheels. Still more particularly, the invention relates to improvements in torsional vibration damping apparatus which can be installed between the output shafts of the engines and the input shafts of the change-speed transmissions in motor vehicles.

Published German patent application No. 34 40 927 discloses a torsional vibration damping apparatus which is installed between the crankshaft of a combustion engine and the input shaft of the variable-speed transmission in an automotive vehicle. The apparatus comprises two coaxial flywheels one of which is non-rotatably secured to the crankshaft and the other of which can be coupled to the input shaft of the transmission by a friction clutch. The damper which is installed between the two flywheels comprises at least one set of energy storing springs (normally coil springs) and, if necessary, friction generating means to oppose each stage or selected stages of angular movement of the flywheels relative to each other. Each flywheel rotates with one or more disc-shaped components which have windows for the coil springs so that the coil springs are caused to store or dissipate energy in response to angular movement of one flywheel relative to the other flywheel and/or vice versa. The friction generating means engage the disc-shaped components and oppose axial movements of the flywheels relative to one another. The energy storing or friction-generating elements between the two flywheels are compelled to rub against each other and/or against the disc-shaped components of the flywheels in response to movement of one flywheel relative to the other flywheel.

OBJECTS OF THE INVENTION

An object of the invention is to provide a novel and improved torsional vibration damping apparatus wherein the wear upon the parts is low and the useful life of the parts is long.

Another object of the invention is to provide an apparatus whose operation is more reliable and more predictable than that of conventional torsional vibration damping apparatus.

A further object of the invention is to provide a relatively simple, compact and inexpensive torsional vibration damping apparatus which can be utilized with advantage in lieu of heretofore known torsional vibration damping apparatus in the power trains of motor vehicles.

Still another object of the invention is to provide novel and improved means for confining the energy storing and/or friction generating components of the above-outlined torsional vibration damping apparatus.

A further object of the invention is to provide a novel and improved method of lubricating the bearing or bearings between the flywheels of the improved torsional vibration damping apparatus.

Another object of the invention is to provide novel and improved means for lubricating the constituents of the damper or dampers between the flywheels of the above outlined torsional vibration damping apparatus.

Still another object of the invention is to provide a novel method of prolonging the useful life of energy storing and other components of the improved torsional vibration damping apparatus.

A further object of the invention is to improve the damping action of the above-outlined apparatus.

SUMMARY OF THE INVENTION

One feature of the present invention resides in the provision of an apparatus for reducing fluctuations of torque which is transmitted between a first flywheel that is connectable to an output element (e.g., a crankshaft) of an internal combustion engine and a second flywheel which is rotatable relative to the first flywheel and has a friction surface engageable with a friction element (such as a clutch plate) of a friction clutch. The improved apparatus comprises means for centering the flywheels including at least one antifriction roller bearing (e.g., a ball bearing with one or more rows of spherical rolling elements). One of the flywheels comprises a first wall and the apparatus further comprises a second wall which is carried by the one flywheel and defines with the first wall an at least substantially sealed chamber for a supply of a viscous fluid medium which at least partially fills the chamber. The second wall preferably includes means for sealing the chamber (particularly in combination with one or more sealing devices), and such second wall is preferably out of contact with the bearing of the centering means. The apparatus further comprises a starter gear on one of the walls and a damper device (e.g., a damper device including two dampers which operate in series) which is disposed in the chamber and includes at least one energy storing element. The latter is resilient in the circumferential direction of the flywheels and connects the flywheels to each other.

The first flywheel can include an axial extension, and a radially outer portion of the second wall preferably abuts an end face of and is affixed to the extension. The apparatus can further comprise a sealing device between the extension and the second sidewall.

The device or devices for sealing the chamber can include an axially stressed diaphragm spring which is adjacent a radially inner portion of the second wall. Such sealing device or devices can further include a sealing element between the diaphragm spring and one of the flywheels and/or a sealing element between the diaphragm spring and a rigid radially inner portion of the second wall.

If the second wall is resilient, its radially inner portion can be axially stressed toward one of the flywheels. The sealing device or devices then preferably include at least one sealing member between the one flywheel and the radially inner portion of the second wall.

The device or devices which are used to seal the chamber can include at least one first sealing element adjacent a radially inner portion of the second wall and at least one additional sealing element which latter is disposed between the two flywheels. One of the flywheels can include a centrally located axial protuberance and the other flywheel is then provided with a recess for the protuberance. The bearing and the at least one additional sealing element can be disposed in the recess.

The damper device can further comprise friction generating means.

The fluid medium preferably fills the chamber to an extent such that the fluid medium contacts the at least one energy storing element at least while the flywheels rotate, i.e., while the fluid medium is acted upon by centrifugal force.

The damper device can comprise at least one hydrodynamic damping unit, at least one hydrostatic damping unit and/or at least one damping unit which operates with shearing effect.

If the damper device comprises a displacement type hydraulic damping unit, such damping unit preferably includes a flange-like member for transmission of torque to the second flywheel, two substantially disc-shaped members which flank the flange-like member and are mounted on one of the flywheels, and means for securing the disc-shaped members to each other. The flange-like member can be provided with at least one circumferentially extending recess for the securing means. The flange-like and disc-shaped members cooperate with the securing means to displace the fluid medium in response to rotation of the flywheels relative to each other. The securing means can be received in the recess of the flange-like member with limited freedom of movement in the circumferential direction of the flywheels to determine the extent of angular movability of the flywheels relative to each other.

The sealing device or devices for the chamber can include at least one first sealing element between the second wall and the second flywheel, and the apparatus can further comprise a thermal barrier between the second flywheel and the bearing. The sealing device or devices then preferably further comprise at least one additional sealing element which is adjacent a race of the bearing.

The second wall and the second flywheel preferably define an annular clearance, and the second flywheel is then provided with at least one passage which serves to convey a coolant (e.g., atmospheric air) into the clearance. The at least one passage can be oriented in such a way that it directs coolant against the second wall.

One side of the bearing preferably faces away from the chamber and the bearing can include an inner race and an outer race. A sealing element of the apparatus is preferably disposed at the aforementioned side of the bearing and is non-rotatably connected with one of the races to bear against the other race. It is preferred to non-rotatably connect the sealing element with the outer race of the bearing and to axially stress the sealing element to bear against the inner race .

A sealing device can be disposed between one of the two races of the bearing and one of the flywheels. The axial protuberance of the first flywheel is surrounded by the inner race of the bearing and the sealing device is preferably interposed between the inner race and the protuberance.

One of the flywheels can be provided with a sealable opening for admission of viscous fluid medium into the chamber.

The sealing device can further include the aforementioned flange-like member which is preferably rigid or substantially rigid and has a radially inner portion with means for transmitting torque to the second flywheel. The flange-like member has one or more first windows for the energy storing element or elements of the damper device and the first flywheel can be provided with one or more second windows for the energy storing element or elements so that such element or elements can transmit torque from the first flywheel to the flange-like member.

The second wall can include a radially outer portion which is carried by the first flywheel and a radially inner portion which includes the aforementioned means for sealing the chamber.

The chamber is preferably provided in or is at least partially defined by the first flywheel.

The second wall preferably extends between axially spaced apart portions of the first and second flywheels.

The first wall is preferably defined by radially extending portions of the one (e.g., the first) flywheel.

Another feature of the invention resides in the provision of an apparatus for reducing fluctuations of torque which is transmitted between a first flywheel that is connectable to an output element of a combustion engine and a second flywheel which is rotatable relative to the first flywheel and is connectable with an input element of a variable-speed transmission by a friction clutch. The apparatus comprises means for centering the flywheels including an antifriction roller bearing, a first wall which is carried by one of the flywheels, a second wall forming part of the one flywheel and directly defining with the first wall at least a portion of an at least partially sealed chamber for a supply of viscous fluid medium which at least partially fills the chamber, sealing means provided on or forming part of the first wall to seal the chamber from the atmosphere, and a damper device which is disposed in the chamber and includes at least one energy storing element which is resilient in the circumferential direction of and connects the flywheels to each other. The first wall is out of contact with the bearing.

A further feature of the invention resides in the provision of an apparatus for reducing fluctuations of torque which is transmitted between a first flywheel that is connectable to an output element of a combustion engine and a second flywheel which is rotatable relative to the first flywheel and is connectable with an input element of a transmission by a friction clutch. The apparatus comprises means for centering the flywheels including an antifriction roller bearing. One of the flywheels is immediately adjacent the engine and supports an at least partially sealed chamber which is at least partially filled with a viscous fluid medium. The chamber is defined by a first wall forming part of the one flywheel and by a second wall between the first wall and the other flywheel. The second wall is out of contact with the bearing and the apparatus further comprises a damper device which is disposed in the chamber and includes at least one energy storing element which is resilient in the circumferential direction of and connects the flywheels to each other.

An additional feature of the invention resides in the provision of an apparatus for reducing fluctuations of torque which is transmitted between a first flywheel that is connectable to an output element of a combustion engine and a second flywheel which is rotatable relative to the first flywheel and has a friction surface engageable with a friction element of a friction clutch. The apparatus comprises means for centering the flywheels including an antifriction roller bearing, a plurality of components defining an at least partially sealed chamber which is at least partially filled with a viscous fluid medium and is carried by one of the flywheels, a starter gear on one of the components, and a damper device provided in the chamber and including at least one energy storing element acting in the circumferential direction of and connecting the flywheels to each other. The at least one energy storing element includes springy convolutions.

Still another feature of the invention resides in the provision of an apparatus for reducing fluctuations of torque which is transmitted between a first flywheel that is connectable to an output element of a combustion engine and a second flywheel which is rotatable relative to the first flywheel and has a friction surface engageable with a friction element of a friction clutch. The apparatus comprises means for centering the flywheels including an antifriction roller bearing, a first wall which is carried by one of the flywheels, a second wall which forms part of the one flywheel and directly defines with the first wall at least a portion of an at least partially sealed chamber which is carried by the one flywheel and is at least partially filled with a viscous fluid medium, and a damper device which is disposed in the chamber and includes at least one energy storing element having springy convolutions and being resilient in the circumferential direction of the flywheels. The at least one energy storing element connects the flywheels to each other.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DESCRIPTION OF THE PREFERRED EMBODIMENTS

Figure 1:
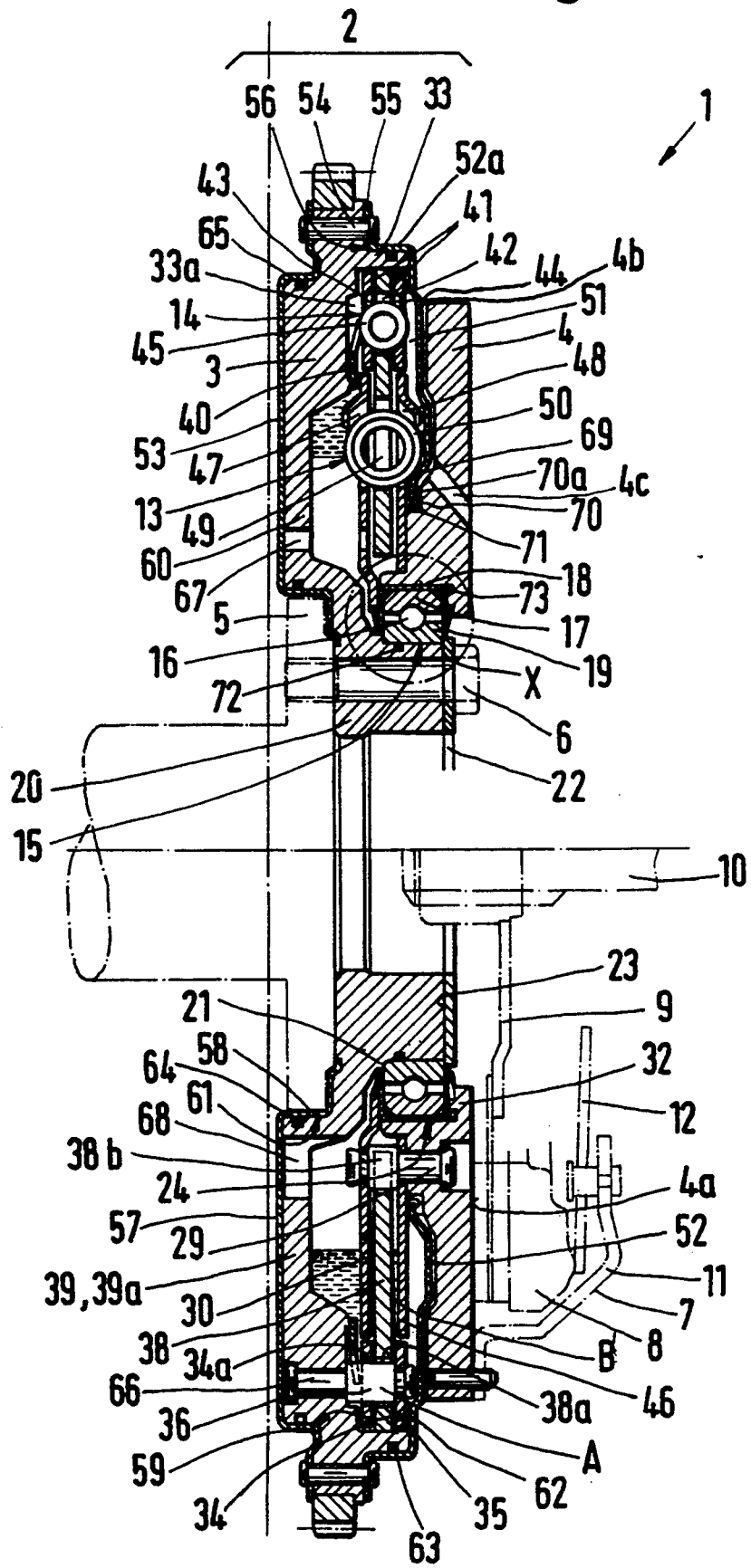
FIG. 1 an axial sectional view of an apparatus which embodies one form of the invention, certain parts being shown by phantom lines.
Figure 2:
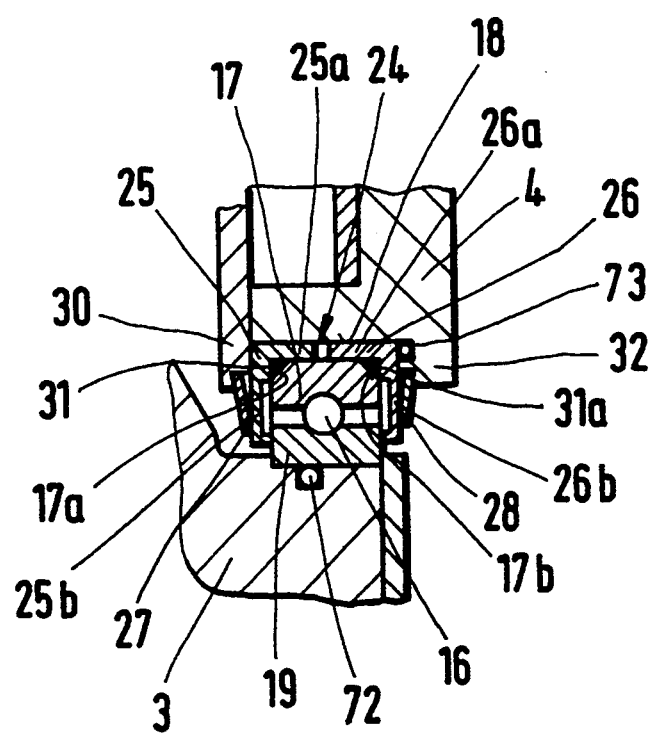
FIG. 2 is an enlarged view of the detail within the phantom-line circle X in FIG. 1.

The torsion damping apparatus 1 which is shown in FIGS. 1 and 2 comprises a composite flywheel 2 including a first flywheel 3 and a second flywheel 4. The flywheel 3 is rigidly connected to the crankshaft (output element) 5 (indicated by phantom lines) of a combustion engine by a set of screws 6, bolts or analogous fasteners (also shown by phantom lines) radially inwardly of the second flywheel 4 which is connectable with the input element or shaft 10 (indicated by phantom lines) of a variable-speed transmission in a motor vehicle by a friction clutch 7 (indicated by phantom lines). The manner in which the friction clutch 7 is connected with the flywheel 4 is known and need not be described here. The friction clutch 7 comprises a cover 11 which is non-rotatably secured to the flywheel 4 and confines an axially movable pressure plate 8 which is biased toward the friction surface 4a of the flywheel 4 by a diaphragm spring 12. When the diaphragm spring 12 is free to bias the pressure plate 8 in a direction to the left, as seen in FIG. 1, the pressure plate 8 cooperates with the flywheel 4 to rotate a friction element or clutch plate 9 which is secured to the input shaft 10. At such time, the crankshaft 5 of the internal combustion engine can drive the input shaft 10 by way of the composite flywheel 2 and the friction clutch 7.

The damper device between the flywheels 3 and 4 comprises a first damper 13 which is in series with a second damper 14. The dampers 13 and 14 oppose angular displacements of the flywheels 3 and 4 relative to each other.

The apparatus 1 further comprises a centering means 15 between the flywheels 3 and 4. The centering means 15 comprises an antifriction roller bearing 16 with a single row of spherical rolling elements. The outer race 17 of the bearing 16 is spacedly surrounded by a cylindrical surface bounding a coaxial recess 18 of the flywheel 4, and the inner race 19 of the bearing 16 is mounted on a coaxial cylindrical protuberance 20 of the flywheel 3. The protuberance 20 extends into the recess 18 of the flywheel 4. The inner race 19 of the bearing 16 is a press fit on the protuberance 20 and abuts a shoulder 21 which is provided on the protuberance. The race 19 is held against axial movement on the protuberance 20 by a disc-shaped retainer 22 which abuts the end face 23 of the protuberance and is held on the protuberance by the aforementioned screws 6.

The apparatus 1 further comprises a thermal barrier or insulator 24 which is interposed between the second flywheel 4 and the outer race 17 of the antifriction bearing 16. The purpose of the insulator 24 is to interrupt or reduce the propagation of heat from the friction surface 4a of the flywheel 4 to the component parts of the bearing 16.

As can be seen in FIG. 2, the thermal insulator 24 comprises two coaxial rings 25 and 26 each of which has a substantially L-shaped cross-sectional outline. The axially extending portions 25a and 26a of the rings are non-rotatably held between the surface bounding the recess 18 of the flywheel 4 and the peripheral surface of the outer race 17. The rings 25, 26 further comprise radially inwardly extending portions 25b, 26b which are adjacent the respective end faces of the outer race 17 and extend inwardly so as to contact the respective end faces of the inner race 19. In this manner, the rings 25, 26 constitute a composite seal which prevents uncontrolled escape of lubricant from the space between the races 17 and 19. The arrangement is preferably such that the radially innermost parts of radially extending portions 25b, 26b of the rings 25, 26 are biased axially so that they bear against the respective end faces of the inner race 19 of the bearing 16. To this end, the thermal insulator 24 preferably comprises energy storing elements in the form of diaphragm springs 27 and 28 which respectively act upon the radially extending portions 25b and 26b in directions to urge the radially innermost parts of the portions 25b, 26b against the adjacent end faces of the inner race 19. The diaphragm spring 27 has a radially outermost portion which reacts against a shoulder on a disc 30 which is secured to the flywheel 4 by fasteners 29 in the form of rivets (see FIG. 1), and the radially innermost portion of the diaphragm spring 27 bears against the radially innermost part of the portion 25b. The diaphragm spring 28 has a radially outermost portion which reacts against a shoulder 32 of the flywheel 4 and a radially innermost portion which applies axial pressure against the adjacent radially innermost part of the radially inwardly extending portion 26b of the ring 26 so that the portion 26b is in proper sealing engagement with the adjacent end face of the inner race 19. The arrangement is preferably such that the bias of one of the diaphragm springs (preferably of the diaphragm spring 28) is greater than the bias of the other diaphragm spring (27). This ensures that, when the clutch 7 is engaged (i.e., when the radially inwardly extending prongs of the diaphragm spring 12 are not acted upon by a bearing or the like in a sense to permit the pressure plate 8 to move axially and away from the flywheel 4), the diaphragm spring 28 urges the flywheel 4 and the outer race 17 in a direction to the right and away from the flywheel 3, as seen in FIG. 1. The extent of rightward movement of the flywheel 4 relative to the flywheel 3 corresponds to the extent of play between the races 17 and 19, as seen in the axial direction of the bearing 16.

When the friction clutch 7 is in the process of being disengaged, the stronger diaphragm spring 28 ensures that the flywheel 4 and the outer race 17 move axially toward the flywheel 3 through a distance which is determined by the just discussed axial play between the races 17 and 19. Such repeated axial shifting of the flywheel 4 and outer race 17 in response to engagement or disengagement of the friction clutch 7 ensures that the rolling elements of the bearing 16 turn relative to the adjacent races 17 and 19. Rolling is desirable and advantageous because it prevents highly localized wear upon the component parts of the bearing 16. Such movements of the rolling elements of the bearing 16 are greatly enhanced if one of the radially inwardly extending portions 25b, 26b (for example, the portion 26b) acts upon the inner race 19 with a force which is greater than that of the other radially inwardly extending portion. When the flywheels 3, 4 turn relative to each other, the radially innermost parts of the portions 25b, 26b rub against the adjacent end faces of the inner race 19 and generate friction which damps the angular movements of the flywheel 4 relative to the flywheel 3 and/or vice versa. The damping action is effective during each and every stage of angular movement of the flywheels 3, 4 relative to each other.

The radially outermost portion of the outer race 17 is chamfered at 17a and 17b to provide ring-shaped compartments with the adjacent rings 25, 26. The compartments receive sealing elements in the form of 0-rings 31, 31a. The purpose of the 0-rings 31, 31a is to prevent the escape of lubricant (such as a grease) from the space between the races 17 and 19 by migrating along the end faces of the outer race 17 and thereupon axially toward the clearance between the rings 25, 26 at the periphery of the race 17.

The outer race 17 is held against axial movement relative to the second flywheel 4 by the rings 25, 26 of the thermal insulator 24. As mentioned above, the ring 25 abuts the disc 30 which is riveted to the flywheel 4, and the ring 26 abuts the integral shoulder 32 of the flywheel 4.

FIG. 1 shows that the flywheel 3 is provided with an axial extension 33 which constitutes the outer wall for an annular chamber 33a for the dampers 13 and 14. The input element of the second damper 14 comprises two axially spaced-apart discs 34, 35 which are non-rotatably secured to the flywheel 3. The disc 35 is secured to the flywheel 3 by distancing elements in the form of rivets 36. The disc 34 has openings 34a through which portions of the distancing elements 36 extend to ensure that the discs 34 and 35 cannot rotate relative to each other. However, the discs 34 and 35 are movable relative to each other in the axial direction of the composite flywheel 2. The output element of the second damper 14 is a flange-like member 38 (hereinafter called flange) which is disposed between the discs 34 and 35. The disc 34 is biased against the flange 38, so as to bias the flange 38 against the disc 35, by an energy storing device in the form of a diaphragm spring 40 which reacts against a radially extending flange 39 of the flywheel 3 and bears against the adjacent side of the disc 34 so as to urge the latter toward the disc 35.

The damper 14 further comprises friction linings 41 which are interposed between the flange 38 and the discs 34 and 35. The flange 38 and the discs 34, 35 are respectively provided with registering windows 42, 43, 44 for energy storing elements in the form of coil springs 45 having springy convolutions. Such coil springs connect the flywheels 3, 4 to each other and oppose angular movements of the flange 38 and the discs 34, 35 relative to each other and are resilient in the circumferential direction of the flywheels.

The flange 38 constitutes the output element of the second damper 14 as well as the input element of the first damper 13. The output element of the damper 13 comprises two discs including the aforementioned disc 30 and a further disc 46. The discs 30, 46 are disposed at opposite sides of the flange 38 and are non-rotatably secured to each other at a predetermined axial distance by the rivets 29 which are anchored in the flywheel 4.

The discs 30, 46 and the flange 38 have registering windows 47, 48 and 49 for energy storing elements in the form of coil springs 50. The purpose of the coil springs 50 is to oppose angular movements of the flange 38 and discs 30, 46 relative to each other.

The radially outermost portion of the flange 38 has circumferentially extending slots or recesses 38a for portions of the respective rivets 36. The extent to which the flange 38 and the rivets 36 can move relative to each other in the circumferential direction of the composite flywheel 2 determines the range of effectiveness of the damper 14. The range of the damper 13 is determined by the circumferential length of the recesses 38b which are provided in the flange 38 for the rivets 29.

The chamber 33a is at least substantially sealed from the surrounding atmosphere and contains a supply of a viscous fluid lubricating medium. The fluid medium can be a silicone oil. The chamber 33a can be partially or completely filled. For example, when the apparatus 1 rotates, the supply of fluid medium can fill the radially outermost portion of the chamber 33a to such an extent that the windings of the coil springs 45 are at least partially contacted by the fluid medium. The coil springs 45 can be partially or completely immersed in the fluid medium. However, the arrangement can also be such that the entire coil springs 45, the entire discs 34 and 35 or at least certain portions of the inner coil springs 50 are contacted by the fluid medium when the apparatus 1 rotates, i.e., when the engine drives the crankshaft 5.

The major part at least of the interior of the chamber 33a is defined by an annular space 51 which is provided in the first flywheel 3 and is bounded at its periphery by the extension 33 of the flywheel 3. The chamber 33a further includes two walls or sidewalls 39a and 52 which extend radially inwardly from the extension 33 at opposite sides of the two sets of coil springs 45 and 50. The sidewall 39a includes the radial flange 39 of the flywheel 3 and a sealing lid 53 which is affixed to the outer side of the flange 39. The sidewall 52 includes or is a cover which is disposed between the flywheels 3 and 4 and is secured to the extension 33 of the flywheel 3. To this end, the sidewall 52 includes an axially extending portion 52a which overlies the extension 33 of the flywheel 3, and a radially outwardly extending brim-like portion 55 which extends from the axially extending portion 52a and is affixed to the flywheel 3 by a set of rivets 54. The brim-like portion 55 of the sidewall 52 abuts a radially extending surface 56 of the flywheel 3.

The rivets 54 serve the additional purpose of securing the sealing lid 53 to the radially outermost portion of the flywheel 3. The lid 53 includes a radially extending major portion or bottom 57 which is adjacent the outer side of the flange 39 of the flywheel 3, a sleeve-like tubular portion 58 which is adjacent the radially innermost portion of the bottom 57, and a sleeve-like tubular portion 59 which is adjacent the radially outermost portion of the bottom 57.

The apparatus 1 further comprises a sealing device including several sealing elements which prevent uncontrolled leakage of fluid medium from the chamber 33a. Some of the sealing elements are installed between the extension 33 of the flywheel 3 and the axially extending portion 52a of the sidewall 52 and other sealing elements are disposed between axially extending tubular portions 58, 59 of the lid 53 and the flywheel 3. The flange 39 of the flywheel 3 includes a radially extending washer-like major portion 60 which is surrounded by the portions 57, 58 and 59 of the lid 53 at the exposed side of the flywheel 3. The sealing element between the axially extending portion 52a of the sidewall 52 and the extension 33 is denoted by the reference character 63, and the sealing elements between the tubular portions 58, 59 of the lid 53 and the washer-like portion 60 of the flange 39 are denoted by the characters 64 and 65. Each of the sealing elements 63–65 can constitute an elastic O-ring. Each O-ring is received in a suitably configurated groove which is machined into the flywheel 3.

The purpose of the lid 53 is to seal the openings 66, 67 and 68 which are provided in the flywheel 3 for the purpose of facilitating assembly of the apparatus 1. The number of such openings can be less than three or it can exceed three.

A sealing ring 70 of slip enhancing material is disposed between the radially innermost portion 69 of the sidewall 52 and the adjacent portion of the flywheel 4. The sealing ring 70 has a substantially L-shaped cross-sectional outline and engages a shoulder 71 of the flywheel 4 radially inwardly of the coil springs 50. The sidewall 52 is preferably made of an elastic or resilient material and is installed in prestressed condition so that it bears against the radially outwardly extending portion 70a of the sealing ring 70. This ensures adequate sealing of the chamber 33a in the region where the radially innermost portion of the sidewall 52 is adjacent the flywheel 4. Such sealing action is satisfactory even after the sealing ring 70 and/or the cover 52 undergoes a certain amount of wear because the sidewall 52 is installed in prestressed condition.

The arrangement for preventing uncontrolled escape of fluid medium from the chamber 33a further includes sealing means between the inner race 19 of the antifriction bearing 16 and the protuberance 20 of the flywheel 3. Such sealing means comprises a sealing ring 72 in the form of an O-ring which is recessed into the periphery of the protuberance 20 (see particularly FIG. 2) and contacts the internal surface of the inner race 19. A further sealing element in the form of an 0-ring 73 is recessed into a groove in the shoulder 32 of the second flywheel 4 adjacent the junction of the portions 26a and 26b of the ring 26 forming part of the thermal insulator 24. Reference may be had to FIG. 2. The illustrated 0-rings 72 and 73 can be replaced with other types of sealing elements without departing from the spirit of the invention.

The chamber 33a is provided primarily in and is carried by the first flywheel 3 and confines the dampers 13, 14 which are at least partially immersed in the viscous fluid medium. The chamber 33a separates the dampers 13 and 14 from the second flywheel 4 which carries the friction clutch 7 to thus ensure that friction heat which is generated by the clutch 7 is not transmitted, or is not fully transmitted, to the damper or dampers and/or to the fluid medium in the chamber 33a. It is preferred to provide an annular clearance or gap 4b between the outer side of the sidewall 52 and the adjacent inner side of the second flywheel 4 and to leave the radially outermost portion of the clearance 4b open for penetration or evacuation of a coolant, preferably atmospheric air. Such coolant can enter the clearance 4b by way of one or more aerating passages 4c which are provided in the second flywheel 4 at the level of the radially innermost portion of the sidewall 52. Currents of air which enter the clearance 4b by way of the passage or passages 4c flow radially outwardly to cool the flywheel 4 as well as the sidewall 52 and to leave the clearance 4b at its radially outermost end.

The radially extending portions 25b and 26b of the rings 25, 26 which form part of the thermal insulator 24 constitute additional sealing elements which prevent escape of fluid medium from the chamber 33a by way of the ring-shaped space for the rolling elements of the antifriction bearing 16 between the inner and outer races 19, 17.

The characteristic curves of coil springs 50 forming part of the damper 13 are flatter than the characteristic curves of coil springs 45 of the damper 14. This ensures that, when the flywheel 3 is caused to change its angular position relative to the flywheel 4 by leaving a neutral or starting position, the coil springs 50 undergo deformation ahead of the coil springs 45. Furthermore, the friction generating means including the radially extending portions 25b, 26b of the rings 25, 26 in the thermal insulator 24 are also active before the coil springs 45 undergo deformation. Deformation of the coil springs 50 can take place simultaneously with angular displacement of the sealing ring 70 and sidewall 52 relative to each other. Consequently, the discs 34, 35, the adjacent friction linings 44 and the flange 38 (which is biased by the diaphragm spring 40) turn relative to the discs 30, 46 which are non-rotatably connected with the flywheel 4. When the moment of the outer damper 14 is exceeded, the rivet or rivets 36 and the discs 34, 35 start to turn relative to the flange 38 so that the coil springs 45 also undergo deformation (they store additional energy) and the moment of friction which is generated by the linings 41 in cooperation with the diaphragm spring 40 becomes effective. When the extent of angular movement of the flywheel 3 relative to the flywheel 4 reaches that maximum value which is determined by the rivet or rivets 29 and the circumferentially extending slot or slots 38b, the damper 13 is blocked and only the damper 14 continues to be effective. The damper 14 remains effective until the rivets 36 reach the one or the other end of the respective arcuate slots or recesses 38a.

As mentioned above, the chamber 33a need not be filled with a viscous fluid medium, such as oil, grease or another viscous substance. As also mentioned above, the quantity of fluid medium in the chamber 33a can be selected in such a way that only the radially outermost portions of, or the entire, outer coil springs 45 are immersed in the fluid medium when the apparatus 1 rotates; that the supply of fluid medium suffices to be in contact with portions of, or the entire, coil springs 50 when the flywheels 3, 4 rotate relative to or together with each other; or that the entire coil springs 50 are immersed in the fluid medium as soon as or at least when the apparatus 1 is set in rotary motion. If the extent of filling of the chamber 33a with a fluid medium is such that the flange 38 and at least the entire radially extending portions of the discs 34, 35 are contacted by the fluid medium, the apparatus defines a hydrostatic damper A which is active at least in the region of the parts 34, 35, 38 because the fluid medium can be pumped through the slot 38a in the flange 38 so that it flows back and forth between the space between the disc 34 and the flange 38 and the space between the flange 38 and the disc 35.

If the fluid medium reaches that portion of the chamber 33a where the discs 30, 46 overlap the corresponding portion of the flange 38 (as seen in a direction toward the common axis of the flywheels 3 and 4), the apparatus 1 defines a viscous damper B which operates with shearing effect between the flywheels 3 and 4.

It is often preferred to select the quantity of fluid medium which is confined in the chamber 33a in such a way that, when the engine which drives the crankshaft 5 is idle, the upper level of the supply of fluid medium does not reach the sealing ring 70. This reduces the likelihood of leakage of fluid medium from the chamber 33a not only when the viscosity of the fluid medium is relatively low but also when the fluid medium is of a pronounced pasty or greasy consistency. A pasty or greasy fluid medium is likely to reduce its viscosity in response to heating when the engine is on to drive the input shaft 10 of the transmission. The viscosity of such fluid medium increases as a result of cooling when the engine is idle but the fluid medium is properly distributed again under the action of centrifugal force as soon as the crankshaft 5 is set in rotary motion. In other words, the hydraulic damping and lubricating action of the confined fluid medium is felt practically instantaneously in response to renewed starting of the engine.

It is clear that the damper device of FIG. 1 can be modified in a number of ways without departing from the spirit and scope of the invention. The damper device can operate hydraulically and/or mechanically, i.e., with or without relying on a supply of viscous fluid medium.

The fluid medium can be a mixture of two or more viscous fluids. An advantage of oils is that their viscosity changes relatively little in response to heating or cooling. However, it is equally possible to employ any one of a variety of fatty or pasty fluid media, particularly those which are capable of retaining their viscosity within the range of temperatures which develop when the improved apparatus is in actual use. It is often sufficient if the viscosity of the confined fluid medium does not appreciably deviate from a standard or optimum value. An advantage of a fluid medium having a relatively high viscosity is that it need not necessarily accumulate in the lower portion of the apparatus 1 when the crankshaft 5 is idle. This could cause the fluid medium in the lower part of the chamber 33a to constitute an eccentric weight which would cause the rotary parts to run out of true. The likelihood of accumulation of heated fluid medium in the lower portion of the chamber 33a is particularly pronounced if the chamber 33a is only partially filled. Quite surprisingly, the improved apparatus operates properly if the fluid medium is a low-viscosity liquid, such as an oil. Low-viscosity fluid media create no problems as concerns the balancing of the apparatus during and immediately after restarting of the engine.

An important advantage of the improved apparatus is that all or nearly all component parts of the dampers 13, 14 are properly lubricated when the apparatus is in use. This considerably reduces the wear upon such parts, particularly upon the coil springs 45, 50, upon the surfaces surrounding the windows for the coil springs as well as upon other parts which would rub directly against each other in the absence of a continuous supply of a lubricating medium. Moreover, proper lubrication enhances the reliability of the apparatus. It has been found that the useful life of the apparatus which employs the chamber 33a and a supply of lubricating medium therein is considerably longer than the useful life of conventional torsion damping apparatus. Proper lubrication further reduces friction between the neighboring springy convolutions of the coil springs 45 and/or 50. Satisfactory lubrication and hence a longer useful life is particularly important when the apparatus is used to transmit torque from a rapidly rotating engine to a variable-speed transmission or another driven component in a motor vehicle or the like. Proper lubrication in such apparatus is desirable because the rapidly rotating engine causes the coil springs to act upon the adjacent surfaces in the windows of the respective plate-like elements under the action of centrifugal force. In conventional apparatus which are used to transmit torque from rapidly rotating engines, the surfaces surrounding the windows cause pronounced wear upon the adjacent portions or convolutions of the coil springs. The lubricant in the chamber 33a effectively prevents or greatly reduces direct metal-to-metal contact between the energy storing elements of the dampers in the chamber 33a and the surfaces bounding the windows for such energy storing elements.

The lubricant in the chamber 33a also eliminates or greatly reduces wear upon the energy storing elements which act in the axial direction of the apparatus 1 as well as upon those parts which are in contact with these energy storing elements.

The provision of one or more dampers which act as hydrodynamic or hydrostatic dampers, or dampers which operate under the action of gravity, also contributes to longer useful life of the improved apparatus. The principle of operation of a hydrodynamic damper can be the same as that underlying the operation of a fluid converter or a Föttinger coupling, and a hydrostatic damper can operate by conveying or pumping the fluid medium through compartments, channels or like passages. This additional damping action can be chosen in advance by appropriate selection of the viscosity of fluid medium in the chamber. Furthermore, such damping action can be regulated by properly selecting the cross-sectional areas of the paths for the flow of fluid medium in a hydrodynamic and/or hydrostatic damper.

The chamber 33a may but need not extend circumferentially all the way around the common axis of the flywheels 3 and 4. It is presently preferred to provide the apparatus with a circumferentially complete (annular) chamber. Savings in space are achieved if the chamber 33a is provided primarily or exclusively in one of the two or more flywheels which constitute the composite flywheel of the improved apparatus.

An important advantage of providing the chamber 33a on or in one of the flywheels is that such chamber can be more readily sealed against undesirable or excessive escape of the confined fluid medium. The provision of the major part of or of the entire chamber 33a in or on the first flywheel 3 is desirable and advantageous because the chamber and the fluid medium therein act as thermal insulators against transmission of excessive quantities of heat from the flywheel 4 to the flywheel 3 when the apparatus 1 is in use. Some heating of the flywheel 4 cannot be avoided because this flywheel carries and cooperates with the friction clutch 7 which transmits torque to the input element 10 of the change-speed transmission.

The relatively thin sidewall 52 between the flywheels 3 and 4 contributes to compactness of the chamber 33a as well as to compactness of the entire apparatus. The radially innermost and outermost portions of the sidewall 52 can be readily sealed by the sealing rings 63 and 70 so as to prevent escape of the confined fluid medium.

The sidewall 52 can exhibit a certain amount of resiliency so that it can be installed in prestressed condition and its radially innermost portion then bears against the radially extending portion 70a of the sealing ring 70 which is adjacent the shoulder 71 of the flywheel 4. This obviates the need for a separate energy storing device as a means for biasing the radially innermost portion of the sidewall 52 against the sealing ring 70. However, it is equally within the purview of the invention to provide a relatively rigid or non-elastic sidewall 52 and to employ one or more diaphragm springs or other resilient elements reacting against the disc 46 and urging the radially innermost portion of the sidewall 52 against the radially extending portion 70a of the sealing ring 70. If a diaphragm spring is used, the apparatus can comprise at least one additional sealing element (for example, an 0-ring) between the diaphragm spring and the disc 46 and/or at least one sealing element between the diaphragm spring and the radially innermost portion of the sidewall 52.

The provision of the aforediscussed radially extending circumferentially complete clearance 4b between the cover 52 and the flywheel 4 and of one or more passages 4c in the flywheel 4 greatly reduces the likelihood of excessive heating of the supply of fluid medium in the chamber 33a. This, in turn, contributes to longer useful life and greater reliability of the dampers 13 and 14. The clearance 4b preferably extends well toward the common axis of the flywheels 3 and 4 so as to ensure that the entire or nearly entire right-hand side of the chamber 33a is properly cooled when the composite flywheel 2 rotates and the flow of a stream of coolant is induced through the passage or passages 4c, in the clearance 4b between the sidewall 52 and the inner side of the flywheel 4, and out from the radially outermost portion of the clearance 4b. A cooling action in the region of the sealing ring 70 is particularly desirable and advantageous. The inclination of the passage or passages 4c can be readily selected in such a way that each such passage induces a pronounced flow of coolant toward the respective portion of the clearance 4b.

Those sealing elements which are caused to rub against each other and/or against other parts of the apparatus can be made of a suitable friction material or slip enhancing material.

While it is also possible to employ a chamber 33a which is defined by two sidewalls each of which corresponds to or resembles the cover 52, the utilization of a chamber wherein one sidewall is constituted directly by one of the flywheels 3, 4 is preferred because this simplifies the construction of the entire apparatus and contributes to compactness of the dampers and of the means for confining the dampers. Moreover, the confined fluid medium can directly cool the flywheel which is provided with the space 51.

The sealing rings 72, 73 and the rings 25, 26 of the thermal insulator 24 can be said to constitute a composite sealing device which acts directly between the flywheels 3 and 4. This can be readily seen in FIG. 2. The 0-ring 72 acts between the flywheel 3 and the inner race 19 of the bearing 16 which, together with the radially extending portions 25b, 26b of the rings 25, 26 and with the 0-rings 73, constitutes a seal between the 0-ring 72 and the second flywheel 4. The placing of the bearing 16 and of the 0-ring 72 around the protuberance 20 of the first flywheel 3 contributes to simplicity and compactness of the apparatus.

Satisfactory results have been achieved when the quantity of fluid medium in the chamber 33a was selected in such a way that the fluid medium filled between one-fourth and three-fourths of the chamber (as measured in the radial direction of the flywheel 2) when the apparatus 1 was in actual use.

Figure 3:
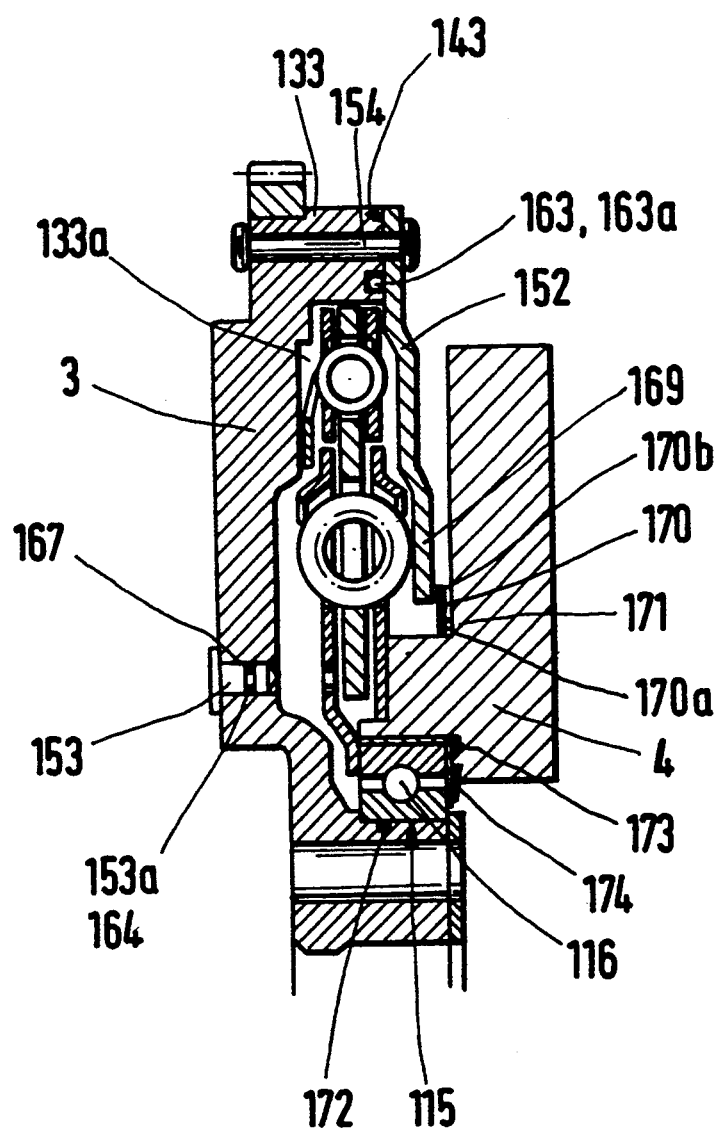
FIG. 3 is a fragmentary axial sectional view of a modified apparatus.

FIG. 3 illustrates a portion of a modified apparatus wherein the lid 53 of the chamber 33a of FIGS. 1 and 2 is omitted. The flywheel 3 of FIG. 3 has one or more openings 167 which are needed to facilitate assembly of the apparatus. Each such opening contains a sealing plug 153 having a head at the outer side of the flywheel 3 and a shank provided with a circumferential groove 153a for a sealing ring 164 which is deformed in response to insertion of the shank into the opening 167. The chamber 133a of FIG. 3 comprises an axial extension 133 at the radially outermost part of the flywheel 3, the radially extending flange of the flywheel 3 (such flange constitutes one wall or sidewall of the components which define the chamber 133a ) and a second sidewall or cover 152 which is rigid or substantially rigid and the radially outermost portion of which is secured to the extension 133 by a set of rivets 154 or similar fasteners so that the radially outermost portion of the cover 152 abuts the end face 143 of the extension 133. The end face 143 is formed with at least one groove 163a for a ring-shaped seal, for example an 0-ring 163 which is deformed when the rivets 154 hold the sidewall 152 in the illustrated position.

The sidewall 152 can be made of a piece of rigid sheet metal and its radially innermost portion 169 cooperates with a sealing device to ensure that the viscous fluid medium cannot escape from the chamber 133a along the inner side of the flywheel 4. The sealing device at the radially innermost portion 169 of the cover 152 comprises a prestressed diaphragm spring 170 which has or carries a first sealing lip 170b bearing against the adjacent side of the portion 169 and a second sealing lip 170a which abuts a shoulder 171 forming part of the internal surface of the flywheel 4. The sealing lips 170a, 170b of the diaphragm spring 170 can be made of a friction generating material or of a slip enhancing material.

The sealing elements 172 and 173 (for example, O-rings) perform the same function as the sealing elements 72 and 73 of FIG. 2. The centering means 115 between the protuberance of the flywheel 3 and the surface bounding the recess of the flywheel 4 comprises an antifriction roller bearing 116 with a single row of spherical rolling elements. The reference character 174 denotes a diaphragm spring which acts as a sealing element between the radially innermost portion of the flywheel 4 and the inner race of the bearing 116 so as to prevent escape of lubricant from the space between the inner and outer races of the bearing. The left-hand side of the space between the races of the bearing 116 is open so that the supply of lubricant in the chamber 133a can serve as a means for lubricating the rolling elements of the bearing 116. This simplifies the construction of the apparatus.

The opening 167 preferably performs the additional function of permitting the admission of viscous fluid medium into the chamber 133a. The sealing plug 153 (or an analogous or equivalent sealing element) is thereupon inserted into the opening 167 to prevent escape of the admitted fluid medium. If the chamber 133a is only partially filled with fluid medium, the opening 167 is preferably located radially inwardly of the ring of fluid medium which develops when the flywheels 3 and 4 are set in rotary motion. One of the openings 67, 68 in the apparatus of FIG. 1 can also serve as a means for facilitating admission of a metered quantity of viscous fluid medium into the chamber 33a.

Referring again to FIGS. 1 and 2, the flange 38 can cooperate with the projection or projections 29 to limit the extent of angular movability of the flywheels 3, 4 relative to each other. The exact extent of such movability is determined by the dimensions of that portion of a projection 29 which extends into the corresponding recess 38b of the flange 38 and the length of the recess 38b (as measured in the circumferential direction of the flywheels 3 and 4). The angular movement of the flywheel 3 relative to the flywheel 4 (and/or vice versa) is terminated when the projection 29 abuts the surface at the one or the other end of the respective recess 38b. The projection or projections 29 further serve to secure the discs 30, 46 to the flywheel 4 (the flange 38 is assumed to rotate with the flywheel 3). The discs 30, 46 and the projection(s) 29 cooperate to pump the fluid medium through the respective recess(es) 38b When the flywheel 3 rotates relative to the flywheel 3 (and/or vice versa) whereby the fluid medium damps such angular movements. This hydraulic damping device can enhance the damping characteristics of the apparatus without the utilization of any additional parts, i.e., the parts which connect the various components to the flywheels, which perform one or more mechanical damping actions and/or which limit the extent of angular movability of the flywheels 3, 4 relative to each other can perform the additional function of acting as a hydraulic damper. The apparatus of FIG. 3 can function in the same way.

The apparatus of the present invention is preferably balanced or trued in such a way that the flywheels 3 and 4 are caused to rotate at a speed which is substantially above the speed of rotation during truing. For example, the flywheels 3 and 4 can be initially rotated at 4000-7000 RPM (preferably at 5000-6000 RPM), and are thereupon decelerated to the truing speed. Such method of balancing is particularly desirable if the fluid medium is of pasty or greasy consistency and only partially fills the chamber 33a or 133a. An important advantage of the step of rotating the flywheels and the chamber at a speed well above the truing speed is that a grease- or paste-like fluid medium which only partially fills the interior of the chamber 33a or 133a forms a uniform ring-shaped body which fills the radially outermost portion of the chamber 33a or 133a. The fluid medium can be selected in such a way that its viscosity does not change at all (or changes only negligibly) in response to anticipated temperature changes in the chamber 33a or 133a. Acceleration of the flywheels to an RPM well above the balancing RPM ensures that even a highly viscous fluid medium fills all portions of the space in the radially outermost part of the chamber 33a or 133a so that such portions of the space do not contain any entrapped air bubbles which could affect the balance of the apparatus in actual use. The magnitude of centrifugal force acting upon the highly viscous fluid medium which only partially fills the chamber 33a or 133a (at the aforementioned RPM) is sufficient to ensure that all traces of air are expelled from the radially outermost portion of the chamber prior to start of the balancing or truing step. This ensures that the balancing action is satisfactory for a long interval of time because the radially outermost portion of the space in the chamber 33a or 133a is invariably filled with fluid medium before the actual balancing operation begins.

The rotational speed of the apparatus prior to start of the balancing step can equal or approximate the maximum RPM of the engine which drives the flywheel 3.

The diaphragm spring 27 and/or 28 of FIGS. 1 and 2 can be omitted if the corresponding radially extending portion 25b and/or 26b is elastic and is installed in prestressed condition so that it bears against the respective end face of the inner race 19. The same applies for the diaphragm spring 174 of FIG. 3 if the adjacent (unnumbered) part of the thermal barrier between the flywheel 4 and the inner race of the centering means 115 is inserted in prestressed condition so that it bears against the inner race to seal the space between the two races of the centering means from the surrounding atmosphere.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for reducing fluctuations of torque which is transmitted between a first flywheel connectable to an output element of a combustion engine and a second flywheel which is rotatable relative to the first flywheel and has a friction surface engageable with a friction element of a friction clutch and transmits torque between the first flywheel and the friction clutch, comprising means for centering said flywheels including an antifriction roller bearing, one of said flywheels comprising a first wall; a second wall carried by said one flywheel and defining with the first wall an at least substantially sealed chamber for a supply of viscous fluid medium which at least partially fills said chamber, said second wall having means for sealing said chamber and said second wall being out of contact with said bearing; a starter gear on one of said walls; and a damper device disposed in said chamber and including at least one energy storing element which is resilient in the circumferential direction of and connects said flywheels to each other.

2. The apparatus of claim 1, wherein said first flywheel includes an axial extension having an end face and a radially outer portion of said second wall abuts said end face and is affixed to said extension, and further comprising sealing means between said extension and said second sidewall.

3. The apparatus of claim 1, further comprising a device for sealing said chamber including an axially stressed diaphragm spring adjacent a radially inner portion of said second wall.

4. The apparatus of claim 3, wherein said sealing device further includes a sealing element between said diaphragm spring and one of said flywheels.

5. The apparatus of claim 3, wherein said second wall includes a rigid radially inner portion and said sealing device further includes a sealing element between said diaphragm spring and the radially inner portion of said second wall.

6. The apparatus of claim 1, wherein said second wall is resilient and includes a radially inner portion which is axially stressed toward one of said flywheels.

7. The apparatus of claim 6, further comprising a sealing device between said one flywheel and the radially inner portion of said second wall.

8. The apparatus of claim 1, further comprising a device for sealing said chamber including at least one first sealing element adjacent a radially inner portion of said second wall and at least one additional sealing element, said at least one additional sealing element being disposed between said flywheels.

9. The apparatus of claim 8, wherein one of said flywheels includes a centrally located axial protuberance and the other of said flywheels has a recess for said protuberance, said bearing and said at least one additional sealing element being disposed in said recess.

10. The apparatus of claim 1, wherein said damper device further comprises friction generating means.

11. The apparatus of claim 1, wherein the fluid medium fills said chamber to an extent such that the fluid medium contacts said at least one energy storing element under the action of centrifugal force at least while said flywheels rotate.

12. The apparatus of claim 1, wherein said damper device comprises at least one hydrodynamic damping unit.

13. The apparatus of claim 1, wherein said damper device comprises at least one hydrostatic damping unit.

14. The apparatus of claim 1, wherein said damper device comprises at least one damping unit which operates with shearing effect.

15. The apparatus of claim 1, wherein said damper device comprises a displacement type hydraulic damping unit, said damping unit including a flange-like member for transmission of torque to said second flywheel, two substantially disc-shaped members flanking said flange-like member and mounted on one of said flywheels, and means for securing said disc-shaped members to each other, said flange-like member having at least one circumferentially extending recess for said securing means and said members cooperating with said securing means to displace the fluid medium in response to rotation of said flywheels relative to each other.

16. The apparatus of claim 15, wherein said securing means is received in said at least one recess with limited freedom of movement in the circumferential direction of said flywheels to determine the extent of angular movability of said flywheels relative to each other.

17. The apparatus of claim 1, further comprising a device for sealing said chamber from the atmosphere including at least one first sealing element between said second wall and said second flywheel, a thermal barrier between said second flywheel and said bearing, said bearing including a race and said sealing device further comprising at least one additional sealing element adjacent said race.

18. The apparatus of claim 1, wherein said second wall and said second flywheel define an annular clearance, said second flywheel having at least one passage to convey a coolant into said clearance.

19. The apparatus of claim 18, wherein said at least one passage is oriented to direct coolant against said second wall.

20. The apparatus of claim 1, wherein said bearing has a side facing away from said chamber and includes an inner race and an outer race, and further comprising a sealing element which is disposed at said side of said bearing, said sealing element being non-rotatably connected with one of said races and bearing against the other of said races.

21. The apparatus of claim 20, wherein said sealing element is non-rotatably connected with said outer race and is axially stressed to bear against said inner race.

22. The apparatus of claim 1, wherein said bearing includes a first race and a second race, and further comprising a sealing device interposed between at least one of said races and one of said flywheels.

23. The apparatus of claim 22, wherein said races include an inner race and an outer race, said first flywheel comprising an axial protuberance which is surrounded by said inner race and said sealing device being interposed between said inner race and said protuberance.

24. The apparatus of claim 1, wherein one of said flywheels has a sealable opening for admission of fluid medium into said chamber.

25. The apparatus of claim 1, wherein said damper device further includes a substantially rigid flange-like member having a radially inner portion with means for transmitting torque to said second flywheel, said flange-like member having first window means for said at least one energy storing element and said first flywheel being provided with second window means for said at least one energy storing element so that the energy storing element can transmit torque from said first flywheel to said flange-like member.

26. The apparatus of claim 1, wherein said second wall includes a radially outer portion which is carried by said first flywheel and a radially inner portion which includes said means for sealing said chamber.

27. The apparatus of claim 1, wherein said one flywheel is said first flywheel.

28. The apparatus of claim 1, wherein said flywheels include portions which are axially spaced apart from each other and said second wall extends between said portions of said flywheels.

29. The apparatus of claim 1, wherein said one flywheel includes radially extending portions which constitute said first wall.

30. Apparatus for reducing fluctuations of torque which is transmitted between a first flywheel connectable to an output element of a combustion engine and a second flywheel which is rotatable relative to the first flywheel and is connectable with an input element of a transmission by a friction clutch, comprising means for centering said flywheels including an antifriction roller bearing; a first wall carried by one of said flywheels, said one flywheel being of one piece with a second wall directly defining with said first wall at least a portion of an at least partially sealed chamber for a supply of viscous fluid medium which at least partially fills said chamber, said first wall including means for sealing said chamber and said first wall being out of contact with said bearing; and a damper device disposed in said chamber and including at least one energy storing element which is resilient in the circumferential direction of and connects said flywheels to each other.

31. Apparatus for reducing fluctuations of torque which is transmitted between a first flywheel connectable to an output element of a combustion engine and a second flywheel which is rotatable relative to the first flywheel and is connectable with an input element of a transmission by a friction clutch, comprising means for centering said flywheels including an antifriction roller bearing, one of said flywheels being immediately adjacent the combustion engine and supporting an at least partially sealed chamber which is at least partially filled with a viscous fluid medium, said chamber being defined by a first wall forming part of and of one piece with said one flywheel and by a second wall between said first wall and the other of said flywheels, said second wall being out of contact with said bearing; and a damper device disposed in said chamber and including at least one energy storing element which is resilient in the circumferential direction of and connects said flywheels to each other.

32. Apparatus for reducing fluctuations of torque which is transmitted between a first flywheel connectable to an output element of a combustion engine and a second flywheel which is rotatable relative to the first flywheel and has a friction surface engageable with a friction element of a friction clutch and transmits torque between the first flywheel and the friction clutch, comprising:
    means for centering said flywheels including an antifriction roller bearing;
    a plurality of components defining an at least partially sealed chamber which is at least partially filled with a viscous fluid medium and is carried by one of said flywheels;
    a starter gear on one of said components, said starter gear being directly carried by the components that form the chamber; and
    a damper device provided in said chamber and including at least one energy storing element acting in the circumferential direction of and connecting said flywheels to each other, said at least one energy storing element having springy coils.

33. Apparatus for reducing fluctuations of torque which is transmitted between a first flywheel connectable to an output element of a combustion engine and a second flywheel which is rotatable relative to the first flywheel and has a friction surface engageable with a friction element of a friction clutch and transmits torque between the first flywheel and the friction clutch, comprising means for centering said flywheels including an antifriction roller bearing; a first wall carried by one of said flywheels; a second wall forming part of and of one piece with said one flywheel and directly defining with said first wall at least a portion of an at least partially sealed chamber which is carried by said one flywheel and is at least partially filled with a viscous fluid medium; and a damper device disposed in said chamber and including at least one energy storing element which comprises springy coils and is resilient in the circumferential direction of and connects said flywheels to each other.

* * * * *